United States Patent
Giancotti et al.

(10) Patent No.: US 12,301,001 B2
(45) Date of Patent: May 13, 2025

(54) POWER PLANT FOR GENERATING ELECTRIC POWER FOR AN ELECTRIC GRID COMPRISING AN ELECTROLYZER POWERED BY THE ELECTRIC GRID

(71) Applicant: NUOVO PIGNONE TECNOLOGIE-S.r.l., Florence (IT)

(72) Inventors: Marco Giancotti, Florence (IT); Tiziano Pellegrini, Florence (IT)

(73) Assignee: Nuovo Pignone Tecnologie-S.R.L., Florence (IT)

( * ) Notice: Subject to any disclaimer, the term of this patent is extended or adjusted under 35 U.S.C. 154(b) by 0 days.

(21) Appl. No.: 18/547,238

(22) PCT Filed: Feb. 24, 2022

(86) PCT No.: PCT/EP2022/025063
§ 371 (c)(1),
(2) Date: Aug. 21, 2023

(87) PCT Pub. No.: WO2022/179753
PCT Pub. Date: Sep. 1, 2022

(65) Prior Publication Data
US 2024/0055943 A1 Feb. 15, 2024

(30) Foreign Application Priority Data
Feb. 25, 2021 (IT) .................. 102021000004421

(51) Int. Cl.
| | |
|---|---|
| H02J 15/00 | (2006.01) |
| F02C 3/20 | (2006.01) |
| F02C 6/00 | (2006.01) |
| H02J 3/32 | (2006.01) |
| H02J 3/38 | (2006.01) |
| C25B 1/04 | (2021.01) |
| C25B 9/67 | (2021.01) |
| C25B 15/02 | (2021.01) |

(Continued)

(52) U.S. Cl.
CPC .............. *H02J 15/008* (2020.01); *F02C 3/20* (2013.01); *F02C 6/00* (2013.01); *H02J 3/32* (2013.01);

(Continued)

(58) Field of Classification Search
CPC . H02J 15/008; H02J 3/32; H02J 3/381; F02C 3/20; F02C 6/00
See application file for complete search history.

(56) References Cited

U.S. PATENT DOCUMENTS

| | | |
|---|---|---|
| 8,329,345 B2 | 12/2012 | Koda et al. |
| 10,422,046 B2 | 9/2019 | Koseoglu et al. |

(Continued)

FOREIGN PATENT DOCUMENTS

| | | |
|---|---|---|
| CN | 107017634 A | 8/2017 |
| EP | 2503114 A2 | 9/2012 |

(Continued)

OTHER PUBLICATIONS

Ranjbar et al., "Hydrogen production using waste heat recovery of MATIANT non-emission system via PEM electrolysis," Modares Mechanical Engineering, vol. 16, No. 10, p. 43-50, 2016.

*Primary Examiner* — Gerald L Sung
*Assistant Examiner* — Rene D Ford
(74) *Attorney, Agent, or Firm* — Paul Frank + Collins P.C.

(57) ABSTRACT

The power plant generates electric power to be provided to an electric grid, the plant including a gas turbine, a steam turbine and one or more electrolyzers that uses electric power to generate hydrogen starting from water; the hydrogen is temporarily stored inside the power plant in a small tank. When power plant energy production exceeds grid energy demand, the electrolyzer is connected to the grid so to usefully consume the electric power not desired by the grid operator at a certain time and generate hydrogen that is used by the gas turbine as a secondary fuel together with a primary fuel.

13 Claims, 3 Drawing Sheets

(51) Int. Cl.
*C25B 15/08* (2006.01)
*F01D 15/10* (2006.01)
*F01K 27/02* (2006.01)
*H02K 7/18* (2006.01)

(52) U.S. Cl.
CPC ............... *H02J 3/381* (2013.01); *C25B 1/04* (2013.01); *C25B 9/67* (2021.01); *C25B 15/02* (2013.01); *C25B 15/081* (2021.01); *F01D 15/10* (2013.01); *F01K 27/02* (2013.01); *F05D 2220/76* (2013.01); *H02K 7/1823* (2013.01)

(56) References Cited

U.S. PATENT DOCUMENTS

| | | | |
|---|---|---|---|
| 2005/0284154 A1* | 12/2005 | Peter | F17C 3/08 62/53.2 |
| 2006/0053792 A1 | 3/2006 | Bourgeois | |
| 2008/0121525 A1* | 5/2008 | Doland | C25B 1/04 322/29 |
| 2011/0101166 A1* | 5/2011 | Schwarze | F02C 9/40 244/135 R |
| 2014/0203557 A1* | 7/2014 | Kim | F01K 23/101 60/39.12 |
| 2015/0337742 A1 | 11/2015 | Bernero et al. | |
| 2015/0361833 A1 | 12/2015 | Hinders et al. | |
| 2019/0264582 A1* | 8/2019 | Hinders | F01K 23/10 |
| 2021/0262100 A1* | 8/2021 | Marushima | F01K 13/02 |
| 2021/0388757 A1* | 12/2021 | Gülen | F02C 3/34 |

FOREIGN PATENT DOCUMENTS

| | | |
|---|---|---|
| IT | AN20 100 059 A1 | 10/2011 |
| JP | 2014141965 A | 8/2014 |
| WO | 2012/013289 A2 | 2/2012 |
| WO | 2012/013289 A3 | 2/2012 |
| WO | 2016/087222 A1 | 6/2016 |

* cited by examiner

POWER PLANT FOR GENERATING ELECTRIC POWER FOR AN ELECTRIC GRID COMPRISING AN ELECTROLYZER POWERED BY THE ELECTRIC GRID

TECHNICAL FIELD

The subject-matter disclosed herein relates to a power plant comprising a gas turbine, a steam turbine and an electrolyzer arranged to be electrically coupled to an electric grid.

BACKGROUND ART

Power plants for generating electric power can be various and are typically connected to an electric grid, local or national, to which the plant provides electric energy.

The total amount of power provided by power plants to the electric grid have to ensure a balance between the electricity supply and the electricity demand in order to guarantee for example the stability of the grid and the continuity of grid operability. For instance, the activity of managing and balancing the flows of electric power through the national grid is known as energy dispatching and is typically managed by grid operators; in Italy the central grid operator is Terna.

Power plants that can adjust their power output according to the demand for electricity are called "dispatchable power plants". Depending on their start-up time and flexibility, dispatchable power plants make long and/or short term offers to grid operators to provide electricity over various time periods. For example, gas turbine or gas engine power plants have short start-up time so they can operate many hours a day or may operate only a few hours per year, being started up and stopped many times due to short starting transients.

On the contrary, power plants that do not have short starting transients are usually designed for continuous operation. An example of plants that may take several days to start up and shut down are nuclear plants or combined cycle plants (=CC); a combined cycle plant includes a gas turbine to produce electricity, a steam turbine to produce electricity, and a steam-producing heat exchanger which uses hot exhaust gas from the gas turbine to generate steam for the steam turbine; the gas turbine is fed by a gas fuel, often natural gas. For example, the gas turbine may produce 75% of CC power output and the steam turbine may produce 25% of CC power output.

In conventional combined cycle plants the electric power output of steam turbine can be lightly reduced, for example reaching a 30% steam turbine power decrease by partialization of the steam turbine, or by regulating the steam produced by the steam-producing heat exchanger and fed to the steam turbine. Partialization of the steam turbine is carried out by closing one or more parts of the turbine inlet annulus, so that the steam passes only through one or more circular sectors; however partialization introduces additional dissipation, due to ventilation losses of blades which drags the steam, and asymmetry of the thrusts on the turbine wheel. The steam regulation is typically carried out by using "sliding pressure" control, i.e. reducing evaporation pressure in the heat exchanger, also called "heat recovery steam generator" (=HRSG); however, sliding pressure control fails in case of sudden change in energy demand, due to the long transient.

In case more significant reductions of the electric power output from the CC plants are desired, for example a 25% reduction of combined cycle power output, the steam turbine is stopped (bypassed), wasting the hot exhaust heat from the gas turbine and resulting in a reduction of combined cycle efficiency. During stopping, the steam turbine is decoupled from HRSG for example by means of a steam bypass system, dumping the steam to the condenser, or by means of a HRSG bypass stack, discharging hot exhaust gas in atmosphere. These off-design conditions may occur during unbalance between energy production and energy demand of power grid, in particular when production exceeds demand, which typically occurs at night because manufacturing operations, in general, stop.

It is known, for example from EP2503114, to use energy, including excess energy from power plants, by producing hydrogen through electrolyzes and storing the hydrogen in large tanks for future use, for example vehicular fueling (including but not limited to: cars, trucks, trains, ships, aircrafts, etc.)—hydrogen vehicles are becoming very popular. However, storing large quantities of hydrogen for a long time causes safety problems for the possibilities of both explosions and/or leakages into the atmosphere. Therefore, in order to overcome these problems

SUMMARY

It would be desirable to increase the flexibility of a combined cycle power plant in terms of electric power provided to an electric grid. In particular, the increased flexibility should be obtained in a relatively easy and cheap way without adding safety problems to the power plant. More in particular, the desired solution should be relatively easily applicable also to already-installed and operating power plants.

According to an aspect, the subject-matter disclosed herein relates to a power plant for generating electric power to be provided to an electric grid; the power plant includes a gas turbine, a steam turbine and at least one electrolyzer that is designed to use electric power in order to generate hydrogen starting from water; the electrolyzer is arranged to be selectively coupled to the electric grid; the hydrogen is temporarily stored inside the power plant in a tank—as it will be apparent from the detailed description the capacity of the tank may be very small, theoretically null. When power plant energy production exceeds grid energy demand, the electrolyzer is connected to the electric grid so to usefully consume the electric power not desired by the grid operator and generate hydrogen that is used by the gas turbine engine as secondary fuel together with a primary fuel. As excess energy is consumed locally to the plant for a useful purpose, the gas turbine and/or the steam turbine may be maintained permanently at the same or approximately the same operating conditions, preferably exactly or approximately at optimal operating conditions.

Advantageously, coupling/decoupling of the electrolyzer to/from the electric grid is performed under the control of a control unit that may store and use predetermined rules and/or receive and use requests.

BRIEF DESCRIPTION OF THE DRAWINGS

A more complete appreciation of the disclosed embodiments and of the attendant advantages thereof will be readily obtained as the same becomes better understood by reference to the following detailed description when considered in connection with the accompanying drawings, wherein.

DETAILED DESCRIPTION OF EMBODIMENTS

Figure 1:
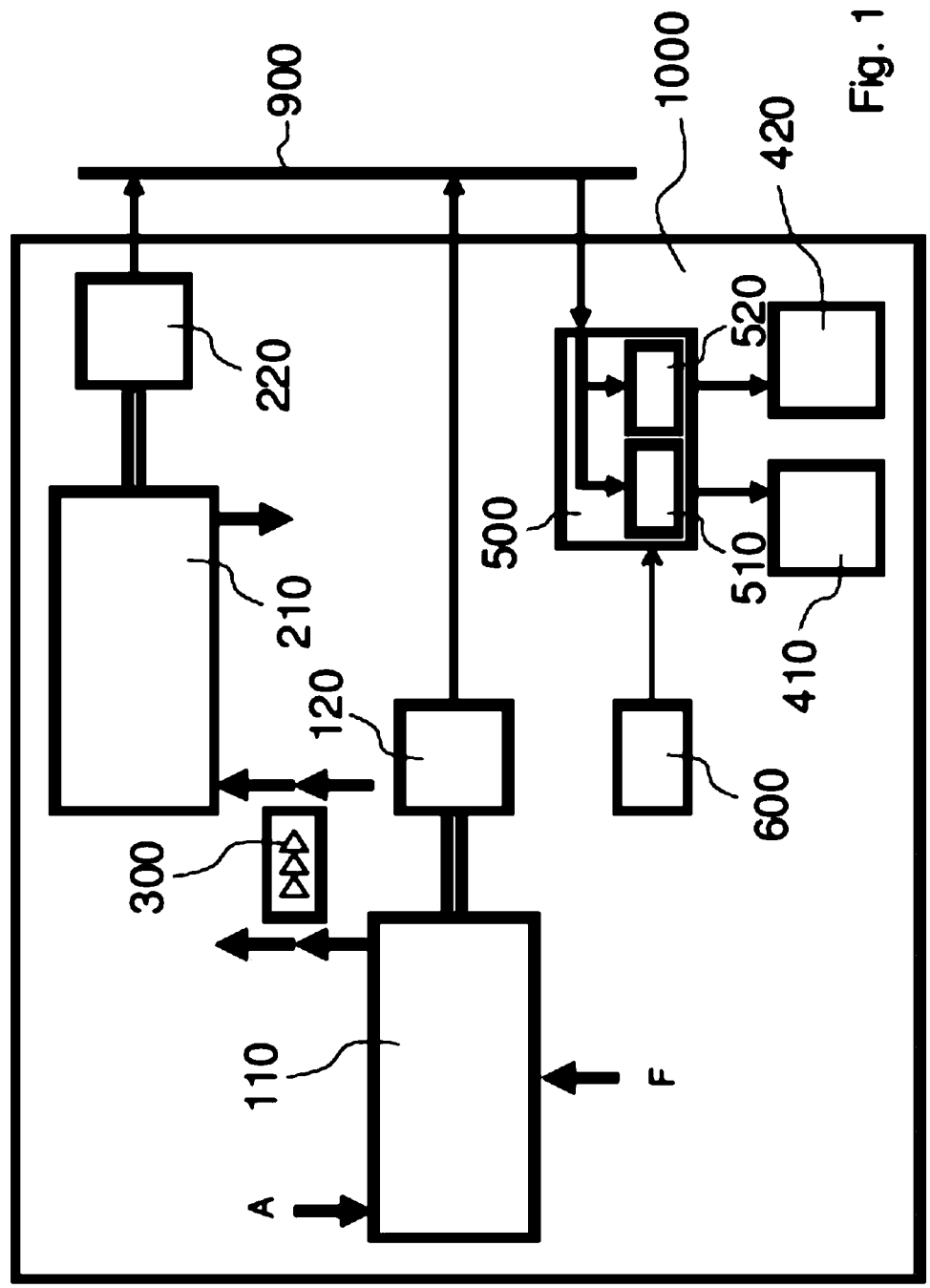
FIG. 1 shows a general schematic diagram of a first embodiment of a power plant with an electrolyzer for generating electric power connected to an electric grid.

The subject matter herein disclosed relates to a power plant for generating electric power to be provided to an electric grid that is able to reduce the amount of electric power provided by the plant to the grid without reducing the overall cycle efficiency.

During periods of low energy demand, for example overnight, a grid operator may ask to a plant operator to reduce significantly the electric power received from its plant, for example by 10-40%. Typically according to the prior-art, in order to reduce electric power output, the plant operator changes the operating conditions of the turbines of the plant but, in so doing, a relevant reduction of overall cycle efficiency arise.

In order to achieve reduction of the electric power provided by a plant to the grid and to avoid reduction of the efficiency of the plant, according the subject-matter disclosed herein the turbines are preferably maintained at their rated capacity, i.e. maximum electric power production (by both the gas turbine and the steam turbine), and one or more electric loads are connected to the grid so to locally consume the electric power not desired by the grid operator at a certain time. The electric loads have a useful purpose, namely generating hydrogen that is as a fuel, in particular a secondary fuel (the turbine of the power plant may burn both a primary fuel, e.g. natural gas, and a secondary fuel, i.e. hydrogen); a machine for generating hydrogen starting from water and electricity is known as "electrolyzer" or "electrolytic cell".

Reference now will be made in detail to embodiments of the disclosure illustrated in the drawings.

The embodiments are provided by way of explanation of the disclosure, not limitation of the disclosure. In fact, it will be apparent to those skilled in the art that various modifications and variations can be made in the present disclosure without departing from the scope or spirit of the disclosure.

With non-limiting reference to FIG. 1, a power plant 1000, in particular a combined cycle power plant, is arranged to generate electric power to be provided to an electric grid 900, the electric grid 900 being for example a national grid or a local grid (for example a microgrid or a nanogrid).

The power plant 1000 includes a gas turbine 110, in particular a compressor compressing inlet air A, a combustor receiving a gas fuel F, also referred in the following as "primary fuel" and being typically natural gas, and a gas hydrogen H, also referred in the following as "secondary fuel", burning the fuel or fuels with an oxidant A, being typically air-fuel, and an expander expanding burned gas, the compressor and the expander having a first rotary shaft. The oxidant A is sucked by the compressor through a suction inlet of the compressor and the expanded burned gas are discharged through an exhaust outlet of the expander. In general, the combustor may be premixed-type or diffusion type. The gas turbine is configured for selective burning, in particular so that, at some times its combustor burns only the primary fuel while at other times it burns both the primary fuel and the secondary fuel, i.e. hydrogen; only during very limited times (if any), it may burn only the secondary fuel, i.e. hydrogen.

A first electric power generator 120 (that is included in the power plant 1000) is coupled to a first rotary shaft of the gas turbine 110 and generates a first electric power output. As shown in FIG. 1, the electric power output of the first electric power generator 120 is arranged to be coupled to the electric grid 900, supplying electric power to the electric grid 900.

According to this embodiment, an exhaust outlet of the gas turbine 110, in particular of its expander, discharges a hot exhaust gas flow still having heat capacity that can be exploited by a heat exchanger 300 that is included in the power plant 1000.

The heat exchanger 300 is advantageously a heat recovery steam generator (HRSG) which is coupled to the exhaust outlet of the gas turbine 110 and it uses part of heat capacity of the exhausted gas to generate steam; therefore, the heat exchanger 300 may also be called "steam generator". Advantageously, the steam produced by HRSG is arranged to be fed to a steam turbine, in particular to a steam inlet of the steam turbine.

The power plant 1000 additionally includes a steam turbine 210 having a second rotary shaft to which a second electric power generator 220 (that is included in the power plant 1000) is coupled; the second electric power generator 220 generates a second electric power output. As shown in FIG. 1, the electric power output is arranged to be coupled to the electric grid 900, supplying electric power to the electric grid 900.

Furthermore, the power plant 1000 includes at least a first electrolyzer 410 having a first electric power input arranged to be selectively coupled to the electric grid 900. In other word, the first electrolyzer 410 can be coupled/decoupled to/from the electric grid 900 and receive an electric input from the electric grid 900. As excess energy is consumed locally to the plant for a useful purpose, i.e. generating hydrogen by the at least one electrolyzer 410, the gas turbine 110 and/or the steam turbine 120 may be maintained permanently at the same or approximately the same operating conditions (preferably exactly or approximately optimal operating conditions) which means generating the same or approximately the same electric power by generators 120 and/or 220. It is to be noted that FIG. 1 shows direct connections between the power plant 1000 and the grid 900; however, the one or more generators of the plant and the one or more electrolyzers of the plant may be directed or indirectly connected to the grid; for example, there may be internal electrical lines for diverting electric energy of the generators directly from the grid to the electrolyzers.

Preferably, the power plant 1000 has a first electric switch 510, located between the first electric input of the first electrolyzer 410 and the electric grid 900, and a control unit 600, coupled to the first electric switch 510 and arranged to control switching of the first electric switch 510, for example sending input to the first electric switch 510. In particular, the electric switch 510 is arranged to connect the first electrolyzer 410 and the electric grid 900 when it is in closed status and disconnect the first electrolyzer 410 and the electric grid 900 when it is in open status.

Preferably, the control unit 600 is arranged to control switching of the first electric switch 510 according to at least one predetermined rule stored in the control unit 600.

For example, the power plant operator may have entered into agreements with the grid operator in such a way as to pre-define periods in which the electric switch 510 is closed and periods in which the electric switch 510 is open, i.e.

respectively periods in which the electrolyzer 410 is coupled with the electric grid 900 and receive an electric input from the electric grid 900 and periods in which the electrolyzer 410 is not coupled to the electric grid 900.

Advantageously, the electrolyzer 410 is coupled with the electric grid 900 when the electric energy demand of the grid from the power plant 1000 is reduced, in such a way that part of the electric power supplied by the power plant 1000 to the electric grid 900 is immediately and locally consumed by the electrolyzer 410. In this way, the power plant 1000 can be advantageously operated always in nominal conditions even if, in such conditions, the agreements with grid operator would have established a reduced electric power supply to the electric grid 900.

Alternatively or additionally, the control unit 600 is arranged to control switching of the first electric switch 510 according to at least one request received by the control unit 600.

For example, the control unit 600 may receive from the grid operator or the plant operator an extemporaneous request of reducing electric power supply to the electric grid 900, due for example to a sudden decrease in electric energy demand. In this case, the control unit 600 closes the electric switch 510 to couple the electrolyzer 410 with the electric grid 900 in such a way that the electrolyzer 410 immediately and locally consumes part of the electric power supplied by the power plant 1000 to the electric grid 900.

It is to be noted that, differently from what described above, the electric power input of the first electrolyzer 410 may be directly connected to the electric power generator 120, 220 output without being connected to the power grid 900 first. In this configuration, the electric switch 510 is located between the electric power generator 120, 220 output and the electric power input of the first electrolyzer 410.

According to the embodiment shown in FIG. 1, the power plant 1000 further comprises a second electrolyzer 420 having a second electric power input selectively coupled to the electric grid 900. In other word, the second electrolyzer 420 can be connected to the electric grid 900 and receive a second electric input from the electric grid 900. In is to be noted that second electrolyzer 420 can be identical or different from first electrolyzer 420.

Preferably, the power plant 1000 has a second electric switch 520, located between the first electric input of the second electrolyzer 420 and the electric grid 900 and a control unit 600 coupled to the second electric switch 520 and arranged to control switching of the second electric switch 520, for example sending input to the second electric switch 520. In particular, the electric switch 210 is arranged to connect the second electrolyzer 420 and the electric grid 900 when it is in closed status and disconnect the second electrolyzer 420 and the electric grid 900 when it is in open status.

Preferably, the control unit 600 is arranged to control switching of the second electric switch 520 according to at least one predetermined rule stored in the control unit 600.

Alternatively or additionally, the control unit 600 is arranged to control switching of the second electric switch 520 according to at least one request received by the control unit 600.

It is to be noted that the control unit 600 coupled to the first electric switch 510 and the control unit 600 coupled to the second electric switch 520 may be the same control unit. In other word, the control unit 600 is arranged to control both first electric switch 520 and second electric switch 520;

FIG. 1 shows switch 510 and switch 520 as assembled in a single switching arrangement 500.

Advantageously, the control unit 600 can control the first electric switch 510 and the second electric switch 520 in different way and with different control logics, for example according to a predetermined rule stored in the control unit 600 or according to at least one request received by the control unit 600. For example, the control unit 600 may close the first electric switch 510, coupling the first electrolyzer 410 with the electric grid 900, and may open the second electric switch 520 in such a way that the second electrolyzer 420 does not receive electric input from the electric grid 900. In this way, the electric power immediately consumed from the electric grid 900 by the power plant 1000, in particular, by the electrolyzers 410 and 420, can be modulated at least in four different manners:

first electric switch 510 open, second electric switch 520 open: both first electrolyzer 410 and second electrolyzer 420 are disconnected from the electric grid 900;

first electric switch 510 open, second electric switch 520 closed: first electrolyzer 410 is connected to the electric grid 900 and second electrolyzer 420 is disconnected from the electric grid 900;

first electric switch 510 closed, second electric switch 520 open: first electrolyzer 410 is disconnected from the electric grid 900 and second electrolyzer 420 is connected to the electric grid 900;

first electric switch 510 closed, second electric switch 520 closed: both first electrolyzer 410 and second electrolyzer 420 are connected to the electric grid 900.

Advantageously, the power plant 1000 may have additional electrolyzers with their respective electric switch that can be selectively coupled to the electric grid 900 by the control unit 600 to more finely modulate the electric power immediately and locally consumed by the power plant 1000.

It is to be noted that electrolysis performed by electrolyzers requires water as well as electric power, so the electrolyzers 410 and/or 420 are fluidly connected also to a water source that provides a water flow, in addition to the electric input provided by the electric grid 900. The water flow source may be external to the power plant 1000 and different depending on the plant configuration or the amount of water required.

The power plant 1000 includes further a tank 800 for storing the hydrogen produced by the first electrolyzer 410 and by the second electrolyzer 420 (if present), and to be burned by the gas turbine 110 (when desired); hydrogen storage is preferably performed at ambient temperature (for example in the range between −10° C. and +40° C.); hydrogen storage is preferably performed at relatively low pressure, for example in the range between 30 bar and 100 bar; it is to be noted that pressure fluctuation in the tank 800 may be for example of 5-20 bar depending on the specific embodiment. In the light of the temporary storage and local use of hydrogen, the tank 800 may be very small; theoretically, its capacity could be null as the hydrogen might be used by the combustor as soon as it is produced by the electrolyzer(s). Typically, the tank is fluidly coupled only to the electrolyzer(s) for receiving hydrogen and only to the combustor of the turbine for transmitting hydrogen; such couplings may be through controlled valves.

A control unit, that advantageously may correspond to control unit 600 already mentioned, may be arranged to control the primary fuel flow and the secondary fuel flow to the a gas turbine 110 through e.g. one or more valves. Preferably, control of the fuel flow or flows is performed according one or more predetermined rule stored in the control unit. This control unit may be further arranged to check a hydrogen level in the tank 800 (that may correspond to the hydrogen pressure in the tank); based on the hydrogen level, the control unit my decide to issue alarms and/or to regulate appropriate the fuel flow or flows.

As already anticipated, the tank 800 has a limited capacity. Its capacity is sufficient, typically exactly sufficient, for assuring operation of the gas turbine 110 for a predetermined time at a predetermined ratio of the secondary fuel and the primary fuel. Advantageously, the predetermined time is in the range 2-20 minutes; it is to be noted that the predetermined period of time may be chosen so to guarantee smooth operation of the combustor even if fluctuations of the primary fuel flow and of the secondary fuel flow occur and considering the speed of the flow control valves. Advantageously, the predetermined ratio is in the range 15-25% in weight. For example, in a 12 MW power plant designed to burn $CH_4$ and $H_2$, wherein 5-minutes combustor operation is guaranteed by the hydrogen tank at a blending ratio of about 20%, the tank may have a capacity of approximately 25 $m^3$—the pressure in the tank may vary between e.g. 30 bar and e.g. 40 bar.

Figure 2:
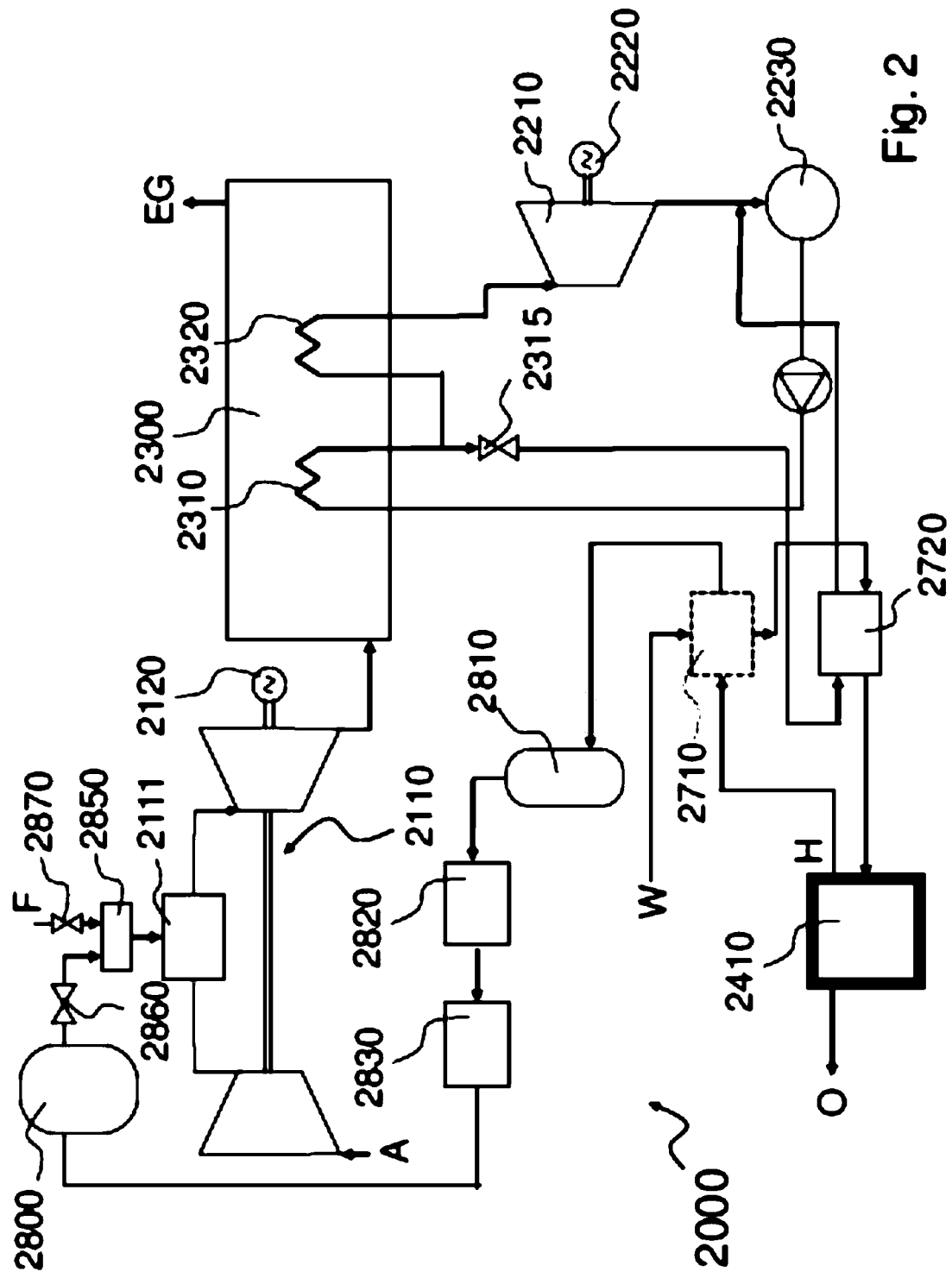
FIG. 2 shows a detailed schematic diagram of second embodiment of a power plant with an electrolyzer.

According to a second embodiment 2000 of a power plant shown in FIG. 2 (that is conceptually similar to the plant of FIG. 1), the power plant further comprises a heat exchanger 2720 for heating a water flow W and producing a heated water flow to be fed at least to the first electrolyzer 2410. The heat exchanger 2720 increases the efficiency of the electrolyzer and allows the use of medium-high temperature electrolyzer fed by the heated water flow produced by the heat exchanger 2720.

It is to be noted that the heated water flow W fed to the electrolyzer 2410 can be water flow, steam flow or a mixed water-steam flow depending on the type of electrolyzer used, for example an alkaline electrolyzer, a proton exchange membrane (PEM) electrolyzer or solid oxide electrolyzer cell (SOEC).

With non-limiting reference to FIG. 2, the heat exchanger 2720 receives heat from the heat recovery steam generator 2300 that is used to heat the water flow W fed to the electrolyzer 2410.

In particular, the heat received from the heat recovery steam generator 2300 is in the form of hot water flow, in particular a steam flow, for example a steam flow picked up between the HRSG evaporator 2320 and the HRSG superheater 2310. In particular, the power plant 1000 has a valve 2315, downstream the evaporator 2320, adapted to deviate part of the steam flow of the steam turbine engine, for example 1-2%, to the heat exchanger 2720. Once the picked-up flow has passed through the heat exchanger 2720 and has released heat to the water flow W fed to the electrolyzer 2410, the picked-up flow is reintroduced to the steam cycle, typically in condensate condition. Advantageously, the picked-up flow is mixed with the outlet flow of the steam turbine 2210, before entering in the condenser 2230.

Figure 3:
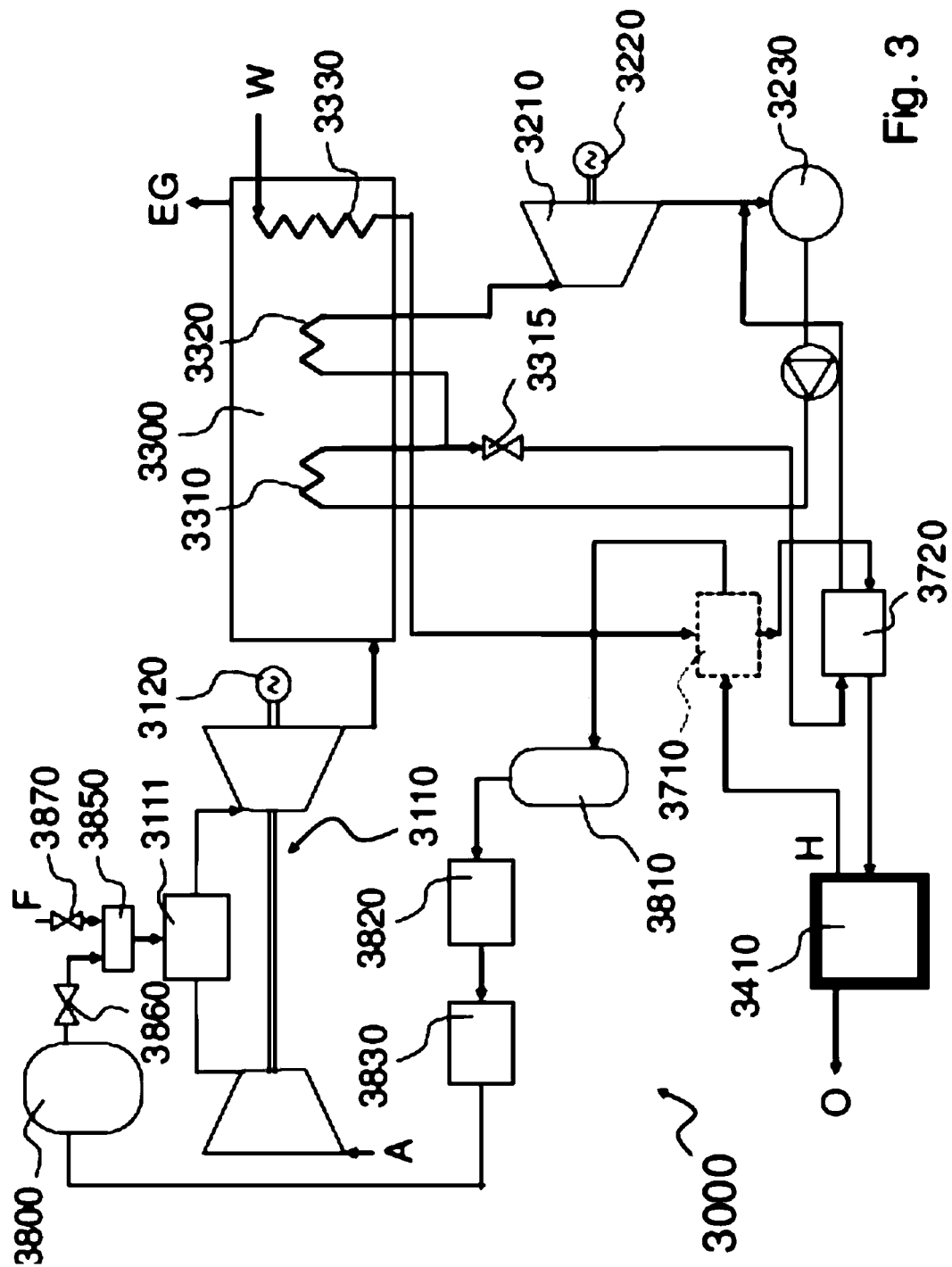
FIG. 3 shows a detailed schematic diagram of third embodiment of a power plant with an electrolyzer.

According to a third embodiment 3000 of a power plant shown in FIG. 3 (that is conceptually similar to the plants of FIG. 1 and FIG. 2), the heat exchanger 3720 receives heat from the heat recovery steam generator 3300, that is used to heat the water flow W fed to the electrolyzer 3410.

Preferably, the heat from the heat recovery steam generator 3300 is generated by exploiting the residual thermal capacity of exhausted gas EG before being released into the atmosphere. This is achieved by passing the water flow W to be fed to the electrolyzer 3410 in an economizer 3330 of the heat recovery steam generator 3300, just before releasing exhausted gas EG into the atmosphere. It is to be noted that, as shown in FIG. 3, the heat exchanger 3720 may receive heat both by exploiting the residual thermal capacity of exhausted gas EG and by deviating part of the steam flow of the steam turbine engine.

The electrolyzers 2410 and 3410, receiving electric energy from the grid 900 and heated water flow, produce as output an oxygen flow O and a hydrogen flow H by electrolysis. It has to be noted that both oxygen flow O and hydrogen flow H may not be pure oxygen or pure hydrogen flows; in particular, the hydrogen flow H can be a mixture of hydrogen and water (in particular steam) flow and/or a mixture of hydrogen and oxygen flow.

Advantageously, the power plants 2000 and 3000 further comprise heat exchangers 2710 and 3710 and the hydrogen flow H produced at least by the electrolyzers 2410 and 3410 is cooled down by the heat exchangers 2710 and 3710. Advantageously, the heat exchangers 2710 and 3710 work also as a pre-heater of the water flow W by using the heat removed from the hydrogen flow H to heat the water flow W. Advantageously, the heat exchangers 2710 and 3710 are pre-heaters of the water flow W fed to the heat exchangers 2720 and 3720; in other word, the heat exchangers 2710 and 3710 are arranged to feed the heated water flow to the heat exchangers 2720 and 3720. With non-limiting reference to FIG. 3, the heat exchanger 3710 is between the economizer 3330 of the heat recovery steam generator 3300 and the heat exchanger 3720.

Advantageously, the power plants 2000 and 3000 are arranged to feed the cooled hydrogen flow to the gas turbines 2110 and 3110. In other word, the gas turbines 2110 and 3110 are arranged to receive hydrogen flow H produced by the electrolyzers 2410 and 3410 and use it as fuel, in particular as "secondary fuel". In particular, the hydrogen flow H is fed to mixers 2850 and 3850 wherein is mixed with a gaseous fuel F, i.e. the "primary fuel" that is typically natural gas, and then the hydrogen-fuel mixture is injected in the combustors 2111 and 31H of the gas turbines 2110 and 3110.

Advantageously, the amount of the hydrogen flow H fed to the mixers 2850 and 3850 can be regulated by regulating valves 286 and 3860 and the amount of the gaseous fuel F fed to the mixers 2850 and 3850 can be regulated by regulating valves 2870 and 3870, so that the gas turbines 2110 and 3110 can be fueled by a mixture which can have different amount of hydrogen and fuel, for example can be fueled with a mixture of 70% fuel and 30% hydrogen or can be fueled up to 100% by the hydrogen flow H produced by the electrolyzers 2410 and 3410.

The power plants 2000 and 3000 are premixed-flame combustion type. However, the technical teachings disclosed herein, in particular one or more of the technical features described with reference to FIG. 2 and FIG. 3, may be applied also to power plants wherein diffusion-flame combustion occurs.

Advantageously, the power plants 2000 and 3000 comprise separators 2810 and 3810 to separate the hydrogen-water flow produced by the electrolyzers 2410 and 3410 to increase the purity level of hydrogen flow H received by the gas turbines 2110 and 3110.

Advantageously, the power plants 2000 and 3000 comprise a deoxygenation stations 2820 and 3820 to separate the hydrogen-oxygen flow produced by the electrolyzers 2410 and 3410 to increase the purity level of hydrogen flow H received by the gas turbines 2110 and 3110.

Advantageously, the power plants 2000 and 3000 comprise a station for removing water from hydrogen flow H, for example with a gravity separator of entrained liquid water from the electrolyzer or dehydration stations 2830 and 3830 to separate the water that may have remained even after the separators 2810 and 3810 to increase the purity level of hydrogen flow H received by gas turbines 2110 and 3110.

Advantageously, the power plants 2000 and 3000 comprise also a tank 2800 and 3800 for storing hydrogen produced by the electrolyzers 2410 and 3410 (or further electrolyzers as shown e.g. in FIG. 1). In particular, these tanks are positioned upstream of the combustor 2111 and 3111 and downstream of the electrolyzers 2410 and 3410 and possibly one or more of the components 2710, 2810, 2820, 2830 shown in FIGS. 2 and 3710, 3810, 3820, 3830 shown in FIG. 3 are fluidly coupled in-between. It is to be noted that none of these components is a compressor, i.e. a machine arranged to increase the pressure of the hydrogen generated by the electrolyzer or electrolyzers.

In general, the coupling components are such that the pressure in the tank(s) is smaller (typically, only few bars smaller) than the pressure at the outlet of the electrolyzer(s); in other words, the coupling components introduce a (small) pressure drop.

Furthermore, in general, the coupling components are such that the pressure in the tank(s) is greater (typically, only few bars greater) than the pressure at the inlet of the combustor: in other words, the coupling components introduce a (small) pressure drop.

The invention claimed is:

1. A power plant configured to generate electric power to be provided to an electric grid, the power plant comprising:
   a gas turbine comprising a first rotary shaft and configured to burn a primary fuel, the gas turbine having an exhaust outlet;
   a first electric power generator coupled to the first rotary shaft, the first electric power generator comprising a first electric power output;
   a steam turbine comprising a second rotary shaft, the steam turbine having a steam inlet;
   a second electric power generator coupled to the second rotary shaft, the second electric power generator comprising a second electric power output;
   a steam generator coupled to the exhaust outlet and arranged to feed steam to the steam inlet;
   a first electrolyzer comprising a first electric power input;
   a tank for storing hydrogen to be produced at least by the first electrolyzer and to be burned by the gas turbine;
   a first heat exchanger for heating a water flow and producing a heated water flow; and
   a second heat exchanger for cooling a hydrogen flow produced at least by the first electrolyzer and producing a cooled hydrogen flow,
   wherein the first electric power output of the first electric power generator is arranged to be coupled to the electric grid,
   wherein the second electric power output of the second electric power generator is arranged to be coupled to the electric grid,
   wherein the first electric power input of the first electrolyzer is arranged to be selectively coupled to the electric grid,
   wherein the tank is fluidly coupled to the gas turbine for selectively burning hydrogen as a secondary fuel,
   wherein the second heat exchanger is arranged to heat a water flow and producing a heated water flow using heat removed from the hydrogen flow
   wherein the power plant is arranged to feed the cooled hydrogen flow to the gas turbine,
   wherein the power plant is arranged to feed the heated water flow at least to the first electrolyzer, and
   wherein the heated water flow produced by the second heat exchanger is fed to the first heat exchanger.

2. The power plant of claim 1, further comprising a control unit arranged to control a primary fuel flow and a secondary fuel flow to the gas turbine.

3. The power plant of claim 2, wherein the control unit is arranged to check a hydrogen level in the tank.

4. The power plant of claim 1, the tank has a limited capacity, the limited capacity being sufficient for assuring operation of the gas turbine for a predetermined time at a predetermined ratio of the secondary fuel and the primary fuel.

5. The power plant of claim 4, wherein the predetermined time is in the range 2-20 minutes, and wherein the predetermined ratio is in the range 15-25% in weight.

6. The power plant of claim 1, further comprising:
   a first electric switch coupled between the first electric input of the first electrolyzer and the electric grid; and
   a control unit coupled to the first electric switch and arranged to control switching of the first electric switch.

7. The power plant of claim 6, wherein the control unit is arranged to control switching of the first electric switch according to at least one predetermined rule stored in the control unit.

8. The power plant of claim 6, wherein the control unit is arranged to control switching of the first electric switch according to at least one request received by the control unit.

9. The power plant of claim 1, further comprising:
   a second electrolyzer having a second electric power input;
   wherein the second electric power input of the second electrolyzer is arranged to be selectively coupled to the electric grid.

10. The power plant of claim 9, further comprising:
    a second electric switch coupled between the second electric input of the second electrolyzer and the electric grid; and
    a control unit coupled to the second electric switch and arranged to control switching of the second electric switch.

11. The power plant of claim 10, wherein the control unit is arranged to control switching of the second electric switch according to at least one predetermined rule stored in the control unit.

12. The power plant of claim 10, wherein the control unit is arranged to control switching of the second electric switch according to at least one request received by the control unit.

13. The power plant of claim 1, wherein the first heat exchanger is arranged to receive waste heat from the steam generator.

* * * * *